United States Patent [19]

Esthimer et al.

[11] 4,277,945
[45] Jul. 14, 1981

[54] CONTROL SYSTEM FOR EQUALIZING THE TORQUES OF MULTIPLE ENGINES DRIVING A COMMON LOAD

[75] Inventors: William F. Esthimer, Walpole; Edward H. Morin, Sharon; Richard E. Trudell, Hingham, all of Mass.

[73] Assignee: Bird-Johnson Company, Walpole, Mass.

[21] Appl. No.: 53,087

[22] Filed: Jun. 28, 1979

[51] Int. Cl.³ .............................................. F01B 21/00
[52] U.S. Cl. ...................................... 60/710; 60/711
[58] Field of Search ......................... 60/700, 710, 711

[56] References Cited

U.S. PATENT DOCUMENTS

| | | | |
|---|---|---|---|
| 2,817,211 | 12/1957 | Reiners | 60/710 |
| 3,479,821 | 11/1969 | Mathers et al. | 60/711 |
| 3,511,052 | 5/1970 | Gillespie | 60/711 |
| 3,986,363 | 10/1976 | Beaman et al. | 60/700 |
| 4,124,980 | 11/1978 | Olson et al. | 60/700 |
| 4,137,721 | 2/1979 | Glennon | 60/711 |
| 4,147,035 | 4/1979 | Moore et al. | 60/711 |

Primary Examiner—Martin P. Schwadron
Assistant Examiner—H. Jay Spiegel
Attorney, Agent, or Firm—Brumbaugh, Graves, Donohue & Raymond

[57] ABSTRACT

A control system equalizes the torques of a lead and a slave engine driving a common load by comparing the throttle settings of the engines and controlling the slave engine throttle with a speed signal equal to the algebraic sum of the lead engine speed signal and a control adjustment signal equal to the sum of an adjusted, selected gain times the sum of the instantaneous error signal and the integral of the error signal over an adjusted, selected reset time.

8 Claims, 2 Drawing Figures

CONTROL SYSTEM FOR EQUALIZING THE TORQUES OF MULTIPLE ENGINES DRIVING A COMMON LOAD

FIELD OF THE INVENTION

This invention relates to a control system for equalizing the torques of two or more engines which drive a common load and, in particular, to a system which is both stable and responsive.

BACKGROUND OF THE INVENTION

When a single speed-governed engine drives a load, the governor sets the throttle at a setting which produces an engine torque output sufficient to maintain the speed commanded by the speed signal supplied to the governor. It does so by comparing the commanded speed and a detected engine speed and responding to any error by adjusting the throttle. The throttle adjustment changes the engine torque output and, therefore, corrects the speed to eliminate, except for "speed droop," the error.

When two or more engines drive a common load, as is often the case in marine propulsion systems, the virtually inevitable differences between the responses of the engine governors and other parts of the engines to speed signal and load changes result in different throttle settings and unequal division of the load among the engines. The engines all run at the same speed, that speed substantially (i.e., subject to "speed droop") matches the command speed, but each governor has no way of detecting whether the speed of the engine it controls is achieved due to the torque of that engine solely or some disproportionate share of the total torque of the multiple engines.

It is, of course, desirable that the load be shared equally by the engines, and engine load-sharing control systems are available. In multiple diesel engine marine propulsion systems, the load-sharing control systems generally used operate on the assumption, which is usually a reasonable one in practice, that if the fuel racks of the engines are set within about one percent of each other, the torque outputs of the engines are equal. Accordingly, the state-of-the-art control systems involve monitoring and comparing the fuel rack positions of the engines and altering the speed signals to the governors in accordance with any differences between the fuel rack settings.

The load-sharing control systems for multiple diesel engine marine propulsion are usually pneumatic. The fuel rack position of each engine is monitored by a fuel rack position detector (a mechanical-pneumatic transducer) which produces an output pressure proportionate to the fuel rack position. Each fuel rack signal is conducted through an orifice to a reservoir, the purpose of which is to produce a time delay between the time that a fuel rack change occurs and the time that the signal indicative of that change is processed in the control system. In a typical system, the reservoir is simply a long length, say about 30 feet, of small-diameter tubing. The fuel rack signals then enter a comparator which compares them and produces an error signal indicative of the difference between the fuel rack settings.

One of the engines is selected as a master or lead engine. The lead engine receives a speed signal which, in most systems, is not altered by the load-sharing control. The other engine or engines receive a modified speed signal produced by algebraically summing the fuel rack error signal and the master engine speed signal.

When the fuel racks of a master and a slave engine do not correspond, the modified speed signal received by the slave engine governor produces an adjustment of the slave engine fuel rack tending to make it coincide with the position of the master engine rack. Most systems have a very high gain—a small error produces a large change in the speed signal supplied to the slave engine governor. The high gain (i.e., small proportional band) tends to move the slave engine fuel rack past the desired position coincident to that of the lead engine fuel rack, and the slave engine fuel rack will "hunt." If a lower gain is applied in the system so that the slave engine fuel rack is brought more slowly toward the desired coincident position, the error between the fuel rack positions eventually disappears, but it takes a long time and the application once again of the unaltered main speed signal causes the governor of the slave engine to respond by moving the slave engine fuel rack away from the desired coincident position. Accordingly, the fuel rack moves back and forth in some band between the desired coincident position and the undesired non-coincident position, an oscillatory form of "hunting". The orifices and reservoirs reduce the frequency and magnitude of oscillation of the slave engine fuel rack but also reduce the responsiveness of the control system.

Present control systems, therefore, reduce the average discrepancy between the torque outputs of the master and slave engines but do not eliminate discrepancy because when the error tends to be eliminated, the characteristics of the governors/engines which led to the error in the first place produce a response which recreates the error. Under some conditions encountered in normal operation, it takes several minutes for the control system to reduce a relatively large separation between engine outputs due to the delay between the time when a fuel rack change occurs and the time of response of the control system. The orifices which produce the delay tend to become clogged with dirt, thus producing larger and longer separations between output torques as time passes from servicing of the system.

SUMMARY OF THE INVENTION

There is provided, in accordance with the present invention, a control system for equalizing the torques of a slave engine and a lead engine driving a common load, each of the engines being of the type which includes a throttle controlled by a governor. The system includes a source of a selected lead engine speed signal. The speed signal is supplied to the governor of the lead engine. A transducer detects the throttle setting of each engine and generates a throttle setting signal indicative of each such setting. A processor continuously processes the throttle setting signals by comparing them and producing from the resulting error signal a control adjustment signal which is substantially equal to a selected gain times the sum of the instantaneous error signal and the integral of the error signal over a selected reset time. The control adjustment signal is combined with the lead engine speed signal in a summing relay to produce a slave engine speed signal which is supplied to the slave engine governor. Preferably, the error signal processor includes means for adjusting the gain and the reset time so that the system can be tuned to the particular engines and load system.

An important aspect of the invention is the reset of the error signal processor. Unlike the load sharing control systems presently in use in which the control system oscillates between a condition in which an error signal exists for part of the time and corrects the throttle setting and in which the error is eliminated for another part of the time, thus resulting in a return of the throttle to a position which produced at least part of the error, the processor, by integrating the error signal over a period of time and adding it to the instantaneous error signal, produces a control adjustment signal which, when summed with the lead engine speed signal compensates for the inherent discrepancy under any particular condition between the fuel rack settings of the lead and slave engines that would exist if speed signals of the same magnitude were supplied to both. Accordingly, when the throttles of both engines are in the same positions and no error signal is generated the processor still produces a control adjustment signal which is the integral of the error signal previously produced over a period of time, i.e., the integration or reset time.

Although it is theoretically possible for a control system according to the present invention to be constructed with a fixed proportional band and a fixed reset, there are important practical advantages to providing for adjustment of the proportional band (i.e., the gain) and the reset in order to accommodate system response characteristics, governor characteristic differences and engine characteristic differences. Both the proportional band and the reset affect the stability and the responsiveness of the system, and adjustment of both permits tuning of the control system to provide stability and good response. If the reset is too long and the gain too low, then a very unresponsive system will result. If the reset is too short and the gain too low, there will never be a complete correction for the error signal. If the gain is too high regardless of the reset time, then the system will be unstable. In general, the reset time should be as low as possible and the gain as high as possible for good responsiveness without instability. Adjustment permits the tuning required for optimum control of a specific installation.

For a better understanding of the invention, reference may be made to the following description of an exemplary embodiment taken in conjuction with the figures of the accompanying drawings.

DESCRIPTION OF THE EMBODIMENT

Figure 1:
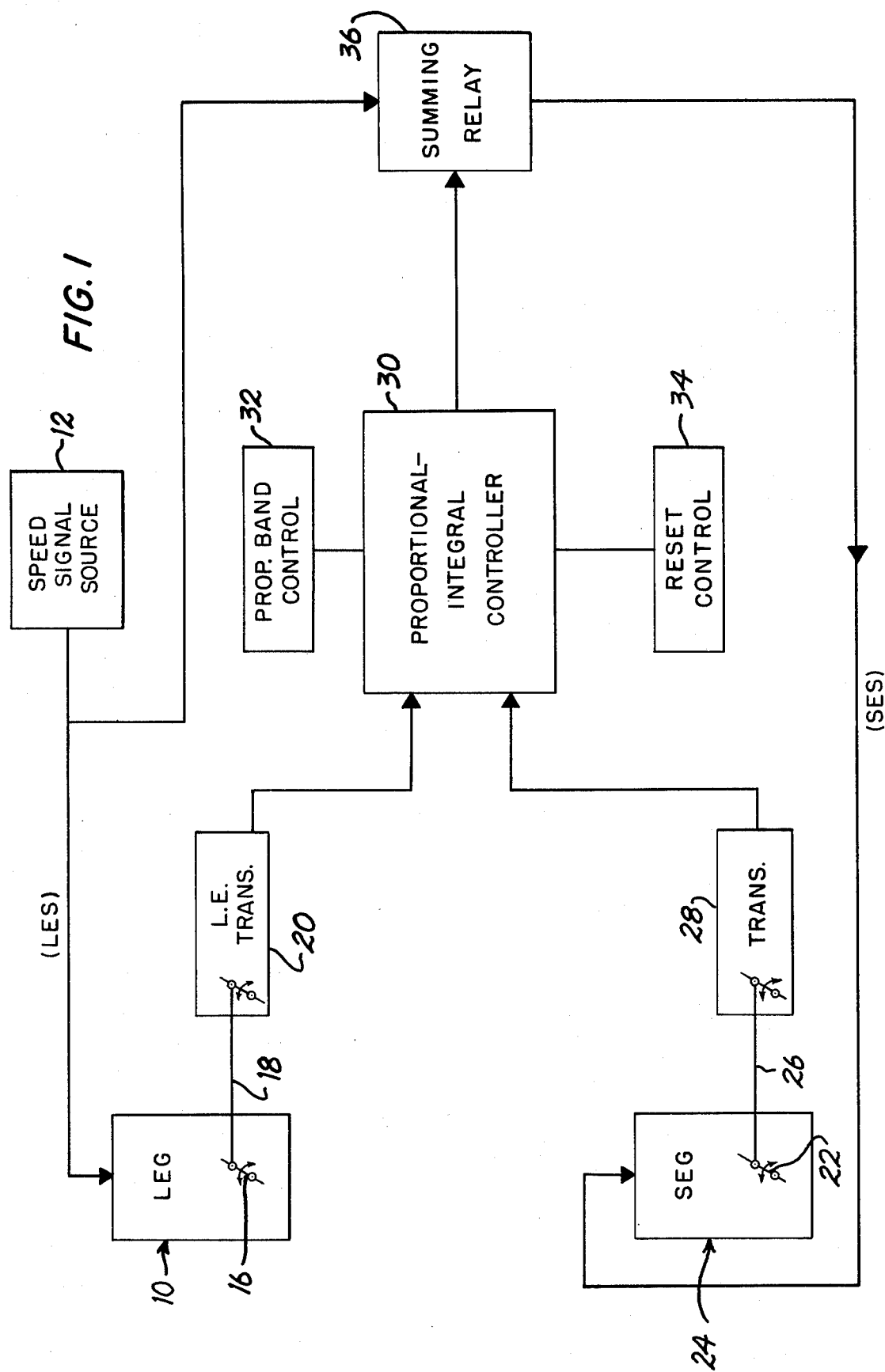
FIG. 1 is a simplified block diagram of the embodiment.

The blocks at the far left of each of the figures which are labelled LEG and SEG represent the governors of two diesel engines driving a common load, such as a marine propeller. One of the two engines is selected as the lead engine, and the governor 10 of the lead engine receives a speed signal (LES, "Lead Engine Speed") from a speed signal source 12. The fuel rack 16 of the lead engine governor is coupled by a linkage 18 to a lead engine fuel rack position transmitter 20. Similarly, the fuel rack 22 of the slave engine governor 24 is coupled by a linkage 26 to a slave engine fuel rack position transmitter 28. The transmitters 20 and 28 are as nearly identical as possible and are calibrated to produce equal signals proportionate to the fuel rack positions of the respective governors 10 and 24. The signals from the position transmitters 20 and 28 are supplied to a proportional-integral controller 30 of a suitable type which includes both proportional band and reset capability. In particular, the controller 30 is of the type which, in mathematical terms, processes the lead engine and slave engine fuel rack transmitter signals $P_L$ and $P_S$ by comparing them $[P_L - P_S = E]$, integrating them over a reset time $T_i$ $[1/T_i \int E dt]$, summing the instantaneous error and the integral $[E + 1/T_i \int E dt]$ and multiplying the sum by a selected gain G $[G(E + 1/T_i \int E dt)]$. Preferably, both the proportional band and the reset constants of the controller are adjustable, as indicated by the blocks 32 and 34 in FIG. 1. The output of the controller is an adjusted error signal represented by the last of the equations given above and is supplied to a summing relay 36. The summing relay 36 receives the lead engine speed signal from the source 12 and the adjusted error signal and combines them into an output signal (SES, "Slave Engine Speed") which is conducted to the slave engine governor 24.

In the absence of the control system shown in FIG. 1 (or any control system for equalizing the torques of the two systems) a change in the speed signal to the governors 10 and 24 or a change in the output load would almost certainly result in a disparity in the fuel rack positions of the governors and a separation, sometimes a very wide separation, between the output torques of the engines. The system shown in FIG. 1 continuously monitors the fuel rack positions of the lead and slave engines, compares them and adds the instantaneous error signal to an integral of the error signal taken over a reset time. A selected gain is applied to the combined instantaneous error and the reset integral.

Of particular importance to the invention is the reset capability of the proportional integral controller. Except for a few engine balance control systems installed on a few ships by the assignee of the present invention some years ago, prior engine balance control systems did not include reset. Without reset a typical control sequence is as follows:

An error arises between the fuel rack positions, and a large error signal is combined with the master engine speed signal, usually after a long time delay during which time the separation between the fuel rack positions may well have increased. The correction of the speed signal to the slave engine moves the fuel rack in a direction toward or even beyond equality. At this point, the error which produced the correction of the slave engine fuel rack disapperars. When the error signal disappears so does the correction of the slave engine speed signal. The original speed signal recreates some or all of the original error in the fuel rack setting of the slave engine governor, so the control cycle repeats. The slave engine output torque, therefore, oscillates about an average value which is unequal to the output torque of the lead engine.

The present invention substantially eliminates both the inherent instability of previous control systems and the inequality between the torque output of the lead engine and the average torque output of the slave engine. The integral of the instantaneous errors over a reset time remains as a substantial part or all of the adjusted error signal produced by the controller 30. Even though the error signal disappears, the integral remains as an output and is combined in the summing relay 36 with the lead engine signal. The system will stabilize with the fuel racks of the two engines in close to identical positions.

Figure 2:
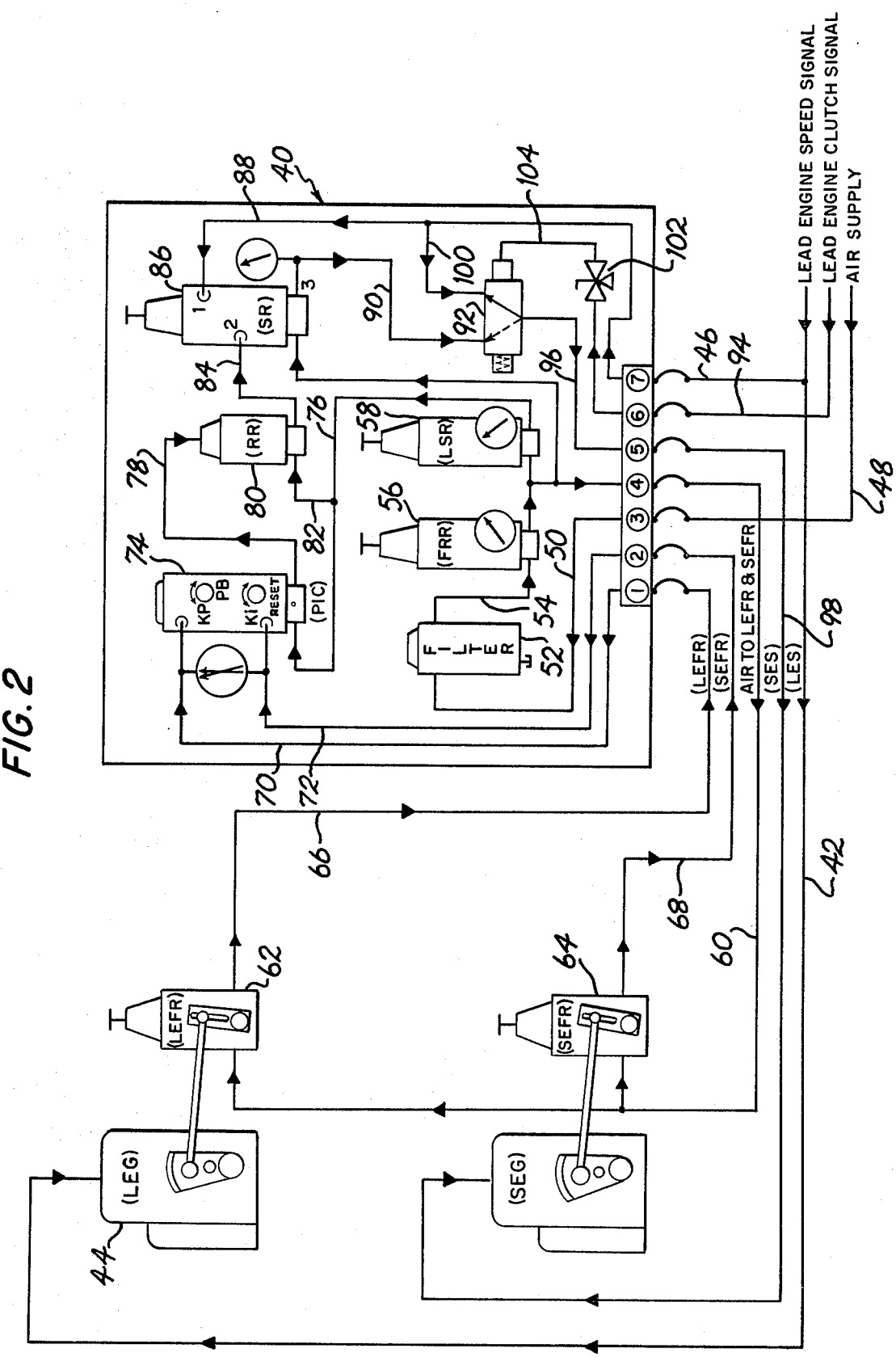
FIG. 2 is a more detailed diagram of the embodiment.

Control systems shown generally in FIG. 1 can employ either electrical or pneumatic components or both electrical and pneumatic components. FIG. 2 illustrates a pneumatic system. The components of the control system are installed on a panel 40 which is preferably located in the engine room. The lead engine speed signal, which usually can be commanded from either the bridge or engine room, is supplied through a line 42 to the lead engine governor 44 and also enters the panel through a line 46. A line 48 from an air supply entres the panel and is connected by a line 50 to a filter 52. Air is supplied from the filter through a line 54 to a pressure regulator 56 which delivers air under relatively high pressure to a second pressure regulator 58 and also to a panel connection No. 4. The high pressure air from the regulator 56 is conducted through a line 60 to the lead engine fuel rack transmitter 62 and the slave engine fuel rack transmitter 64. The transmitters are mechanical-pneumatic transducers and produce output pressures which are proportional to the position of a lever which is linked to the corresponding engine throttle. The outputs of the transmitters 62 and 64 are conducted through lines 66 and 68 to connections Nos. 1 and 2 of the panel 40 and by lines 70 and 72 to input ports on a pneumatic proportional-integral controller 74. A relatively low pressure air supply is delivered through line 76 from the regulator 58 to the air supply port of the controller 74. The output of the controller is connected by a line 78 to a ratio relay 80, the sole purpose of which is to adjust the range of the proportional band of the controller 74 by merely dividing the output of the controller by a fixed amount by proportioning an input pressure from the low pressure regulator 58 delivered through line 82. The adjusted error signal is conducted by a line 84 to one input port of a summing relay 86. The other input port of the summing relay is connected by a line 88 to panel connection No. 7 (Lead Engine Speed Signal), and the output is connected by a line 90 to a selector valve 92. The selector valve 92 is controlled by the lead engine clutch control signal which is conducted to connection No. 6 on the panel by a line 94. When the lead engine clutch signal is applied to the selector valve 92, the output from the summing relay is connected by lines 96 and 98 to the slave engine governor. When the lead engine clutch is not engaged, the line 96 is connected through the valve 92 to a bypass line 100 so that the lead engine speed signal is conducted directly to the slave engine governor and bypasses the control system. The control system can also be bypassed by shifting a bypass valve 102 in the line 104 which receives the clutch signal to the exhaust position; the valve 92 is shifted to the bypass position because the clutch signal is not received by the valve 92.

We claim:

1. A control system for equalizing the torques of a slave engine and a lead engine driving a common load, each engine including a throttle controlled by a governor, comprising means for producing a selected lead engine speed signal and supplying it to the governor of the lead engine, means for detecting the throttle setting of each engine and producing a throttle setting signal indicative of each such setting, means for comparing the throttle setting signals of the lead engine and the slave engine and producing an error signal indicative of the difference in throttle settings, processing means for continuously processing the error signal to produce a control adjustment signal substantially equal to a selected gain times the sum of the instantaneous error signal and the integral of the error signal over a selected reset time, means for adding algebraically the control adjustment signal to the lead engine speed signal to produce a slave engine speed signal, and means for supplying the slave engine speed signal to the slave engine speed controller.

2. A control system according to claim 1 in which the processing means includes means for adjusting the selected gain.

3. A control system according to claim 1 or 2 in which the processing means includes means for adjusting the reset time.

4. A control system according to claim 1 or claim 2 wherein the control system is entirely pneumatic.

5. A control system according to claim 1 or claim 2 in which each engine is a diesel engine, the throttle of each diesel engine is a fuel rack and the speed controller of each engine is a governor.

6. A control system for equalizing the torques of a slave diesel engine and a lead diesel engine driving a common output, each engine including a fuel rack controlled by a governor in accordance with a pneumatic speed signal supplied to the governor, comprising means for producing a selected lead engine speed signal and supplying it to the lead engine governor, a fuel rack position transmitter associated with the fuel rack of each engine for continuously producing a pneumatic fuel rack position signal indicative of the fuel rack position of the respective engine, a pnematic proportional-integral controller having means for receiving, comparing and biasing the instantaneous fuel rack position signals to produce an instantaneous error signal, integrating the instantaneous error signal over a selected reset time, summing the product and integral, and multiplying the sum times a selected gain to produce a slave engine control adjustment signal, and a pneumatic summing relay having means for receiving and summing the control adjustment signal and the lead engine speed signal and adjusting the sum to offset the bias of the proportional-integral controller to produce a slave engine speed signal for delivery to the slave engine governor.

7. A control system according to claim 6 in which the proportional-integral controller further includes means for adjusting the gain of the error signal.

8. A control system according to claim 6 or 7 in which the proportional-integral controller further includes means for adjusting the reset time over which the error signal is integrated.

* * * * *